United States Patent
Zhang

(10) Patent No.: US 11,353,680 B2
(45) Date of Patent: Jun. 7, 2022

(54) IMAGING MODULE, CAMERA ASSEMBLY, AND ELECTRONIC DEVICE

(71) Applicant: GUANGDONG OPPO MOBILE TELECOMMUNICATIONS CORP., LTD., Guangdong (CN)

(72) Inventor: Gong Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/307,546

(22) Filed: May 4, 2021

(65) Prior Publication Data

US 2021/0255418 A1 Aug. 19, 2021

Related U.S. Application Data

(63) Continuation of application No. PCT/CN2019/109362, filed on Sep. 30, 2019.

(30) Foreign Application Priority Data

Nov. 6, 2018 (CN) .......................... 201811311111.9

(51) Int. Cl.
*G02B 7/09* (2021.01)
*G03B 30/00* (2021.01)
(Continued)

(52) U.S. Cl.
CPC ............ *G02B 7/09* (2013.01); *G02B 27/646* (2013.01); *G03B 5/00* (2013.01); *G03B 13/36* (2013.01);
(Continued)

(58) Field of Classification Search
None
See application file for complete search history.

(56) References Cited

U.S. PATENT DOCUMENTS

| 7,719,749 | B1 | 5/2010 | Minor et al. | |
| 2005/0253951 | A1* | 11/2005 | Fujimoto | H04N 5/2254 |
| | | | | 348/335 |

(Continued)

FOREIGN PATENT DOCUMENTS

| CN | 2706784 Y | 6/2005 |
| CN | 1682525 A | 10/2005 |

(Continued)

OTHER PUBLICATIONS

International Search Report with English Translation International application No. PCT/CN2019/109362 dated Jan. 14, 2020 (13 pages).

(Continued)

*Primary Examiner* — Quan Pham
(74) *Attorney, Agent, or Firm* — Young Basile Hanlon & MacFarlane, P.C.

(57) ABSTRACT

The present disclosure provides an imaging module, a camera assembly and an electronic device. The imaging module includes a housing, including a light inlet; a reflective element, a mounting base, and an image sensor arranged in the housing; the reflective element being configured to redirect incident light from the light inlet to the image sensor, and the image sensor sensing the incident light outside the imaging module; the reflective element arranged on the mounting base; the mounting base being arranged with a limiting structure connected to the reflective element and configured to limit a position of the reflective element on the mounting base.

18 Claims, 10 Drawing Sheets

(51) Int. Cl.
  *G02B 27/64* (2006.01)
  *G03B 5/00* (2021.01)
  *G03B 13/36* (2021.01)
  *H04N 5/225* (2006.01)
  *H04N 5/232* (2006.01)
  *H04N 5/247* (2006.01)

(52) U.S. Cl.
  CPC ........... *G03B 30/00* (2021.01); *H04N 5/2253* (2013.01); *H04N 5/2254* (2013.01); *H04N 5/2328* (2013.01); *H04N 5/23212* (2013.01); *H04N 5/23258* (2013.01); *H04N 5/247* (2013.01); *G03B 2205/0007* (2013.01)

(56) References Cited

U.S. PATENT DOCUMENTS

| | | | |
|---|---|---|---|
| 2017/0017139 A1 | 1/2017 | Kilic | |
| 2018/0120584 A1* | 5/2018 | Hu | ................ G03B 17/17 |

FOREIGN PATENT DOCUMENTS

| CN | 101833157 A | | 9/2010 | |
|---|---|---|---|---|
| CN | 203933809 U | | 11/2014 | |
| CN | 204667030 U | | 9/2015 | |
| CN | 205356516 U | | 6/2016 | |
| CN | 106405991 A | | 2/2017 | |
| CN | 206039030 U | | 3/2017 | |
| CN | 206117816 U | * | 4/2017 | |
| CN | 106990551 A | | 7/2017 | |
| CN | 107037567 A | | 8/2017 | |
| CN | 206421098 U | | 8/2017 | |
| CN | 107515459 A | | 12/2017 | |
| CN | 206725924 U | | 12/2017 | |
| CN | 107645624 A | * | 1/2018 | ............ H04N 5/247 |
| CN | 107783243 A | * | 3/2018 | ............ G02B 7/02 |
| CN | 107911579 A | | 4/2018 | |
| CN | 108107649 A | | 6/2018 | |
| CN | 108366224 A | | 8/2018 | |
| CN | 108449540 A | | 8/2018 | |
| CN | 108600594 A | | 9/2018 | |
| CN | 108600601 A | | 9/2018 | |
| CN | 207869230 U | | 9/2018 | |
| CN | 207968573 U | * | 10/2018 | ............ G06F 1/1686 |
| CN | 109274877 A | | 1/2019 | |
| CN | 208581285 U | * | 3/2019 | |
| DE | 19708684 A1 | | 6/1997 | |
| KR | 20170019753 A | * | 2/2017 | ............ H04N 5/247 |
| WO | WO-2020047754 A1 | * | 3/2020 | ............ G02B 7/02 |

OTHER PUBLICATIONS

First Office Action with English Translation from China patent office in a counterpart Chinese patent Application 201813111119 dated Feb. 6, 2020 (18 pages).

Second Office Action with English Translation from China patent office in a counterpart Chinese patent Application 201813111119 dated Jul. 9, 2020 (18 pages).

Third Office Action with English Translation from China patent office in a counterpart Chinese patent Application 201813111119 dated Nov. 12, 2020 (20 pages).

Extended European Search Report for EP Application 19881053.3 dated Dec. 2, 2021. (8 pages).

\* cited by examiner

US 11,353,680 B2

IMAGING MODULE, CAMERA ASSEMBLY, AND ELECTRONIC DEVICE

CROSS-REFERENCE TO RELATED APPLICATION(S)

The present disclosure is a continuation-application of International (PCT) Patent Application No. PCT/CN2019/109362, filed on Sep. 30, 2019, which claims priority to Chinese Patent Application No. 201811311111.9 filed on Nov. 6, 2018, the entire contents of both of which are hereby incorporated by reference.

TECHNICAL FIELD

The present disclosure relates to the field of electronic devices, and in particular to an imaging module, a camera assembly, and an electronic device.

BACKGROUND

In the related art, in order to improve the photographing effect of a mobile phone, the camera of the mobile phone is adopted with a periscope camera. For example, the periscope camera can perform three times optical length focusing to obtain a higher quality image. The periscope camera includes a reflective element. The reflective element is configured to redirect the light incident into the periscope camera and transmit the light to an image sensor, such that the image sensor may obtain an image outside the periscope camera. However, when the periscope camera is impacted, the position of the reflective element may be shifted, which affects the normal use of the periscope camera.

SUMMARY

The present disclosure provides an imaging module, a camera assembly, and an electronic device.

The imaging module provided by the embodiments of the present disclosure includes: a housing, including a light inlet; a reflective element, a mounting base, and an image sensor arranged in the housing; the reflective element being configured to redirect incident light from the light inlet to the image sensor, and the image sensor sensing the incident light outside the imaging module; the reflective element arranged on the mounting base; the mounting base being arranged with a limiting structure connected to the reflective element and configured to limit a position of the reflective element on the mounting base.

The camera assembly provided by the embodiments of the present disclosure includes a first imaging module, a second imaging module, and a third imaging module; wherein the first imaging module is an imaging module as described above. A field of view of the third imaging module is greater than the field of view of the first imaging module and less than the field of view of the second imaging module.

The electronic device provided by the embodiments of the present disclosure includes a body and a sliding module configured to slide between a first position received in the body and a second position exposed from the body. A camera assembly as described above is disposed in the sliding module.

Additional aspects and advantages of the present disclosure will be partially given in the following description, and some will become apparent from the following description, or be learned through practice of the present disclosure.

BRIEF DESCRIPTION OF DRAWINGS

The above and/or additional aspects and advantages of the present disclosure will become apparent and easily understood from the description of the embodiments in conjunction with the following drawings.

Figure 1:
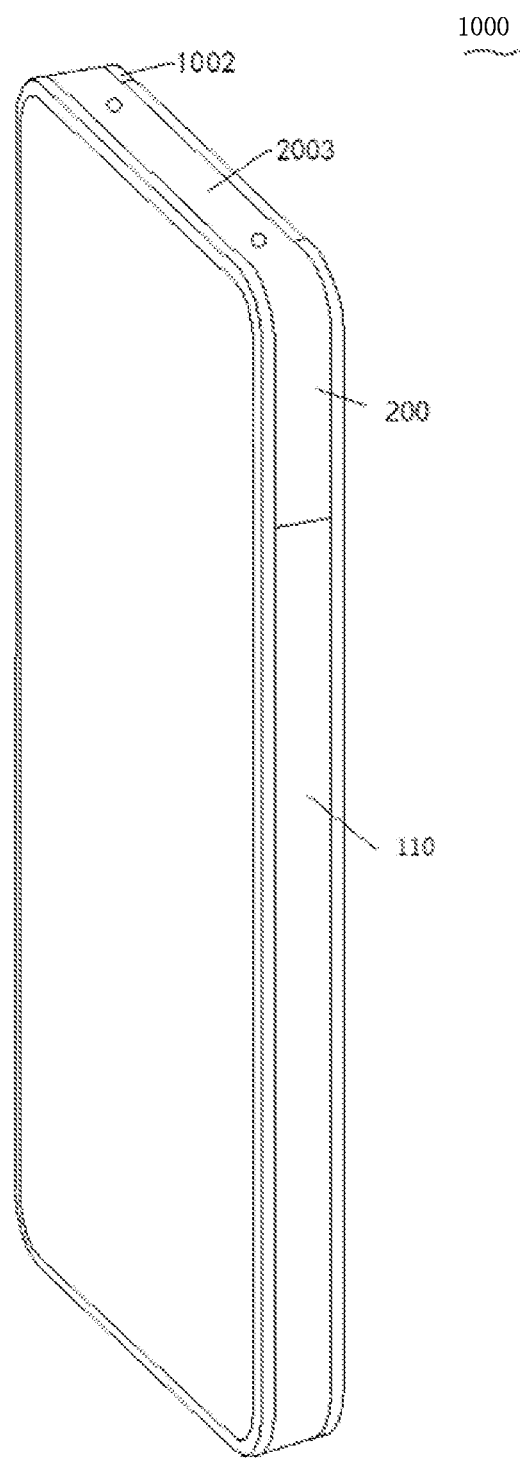
FIG. 1 is a schematic view of an electronic device according to an embodiment of the present disclosure in a state.

Symbol description of main components:

electronic device 1000, body 110, sliding module 200, gyroscope 120;

camera assembly 100, first imaging module 20, housing 21, light inlet 211, top wall 213, side wall 214, escape hole 215, reflective element 22, light incident surface 222, backlight surface 224, light reflective surface 226, light emitting surface 228, mounting base 23, arc-shaped surface 231, first lens assembly 24, lens 241, moving element 25, clip 222, first image sensor 26, drive mechanism 27, drive device 28, arc-shaped guide rail 281, central axis 282, chip circuit board 201, mounting portion 2011, connecting portion 2022, drive chip 202, sensor circuit board 203, shielding cover 204, second imaging module 30, second lens assembly 31, second image sensor 32, third imaging module 40, bracket 50.

DETAILED DESCRIPTION

The embodiments of the present disclosure will be described in detail, and examples of the embodiments are shown in the drawings, in which same or similar reference numerals indicate same or similar elements or elements having same or similar functions throughout. The embodiments described with reference to the drawings are exemplary, only to explain the present disclosure, and cannot be construed as limiting the present disclosure.

The following disclosure provides many different embodiments or examples for implementing different structures of the present disclosure. In order to simplify the present disclosure, the components and configurations of specific examples are described below. Of course, they are only examples, and the purpose is not to limit the present disclosure. In addition, the present disclosure may repeat reference numerals and/or reference letters in different examples. Such repetition is for the purpose of simplicity and clarity, and does not itself indicate the relationship between the various embodiments and/or configurations discussed. In addition, the present disclosure provides examples of various specific processes and materials, but a person skilled in the art may be aware of the application of other processes and/or the use of other materials.

A reflective element in a periscope camera is susceptible to positional deviation when the periscope camera is dropped or other similar situations, and the reflective element thus cannot accurately redirect the light to an image sensor. In this way, the image sensor may not accurately sense an image of an object outside the periscope camera, and a normal use is no longer possible.

Figure 2:
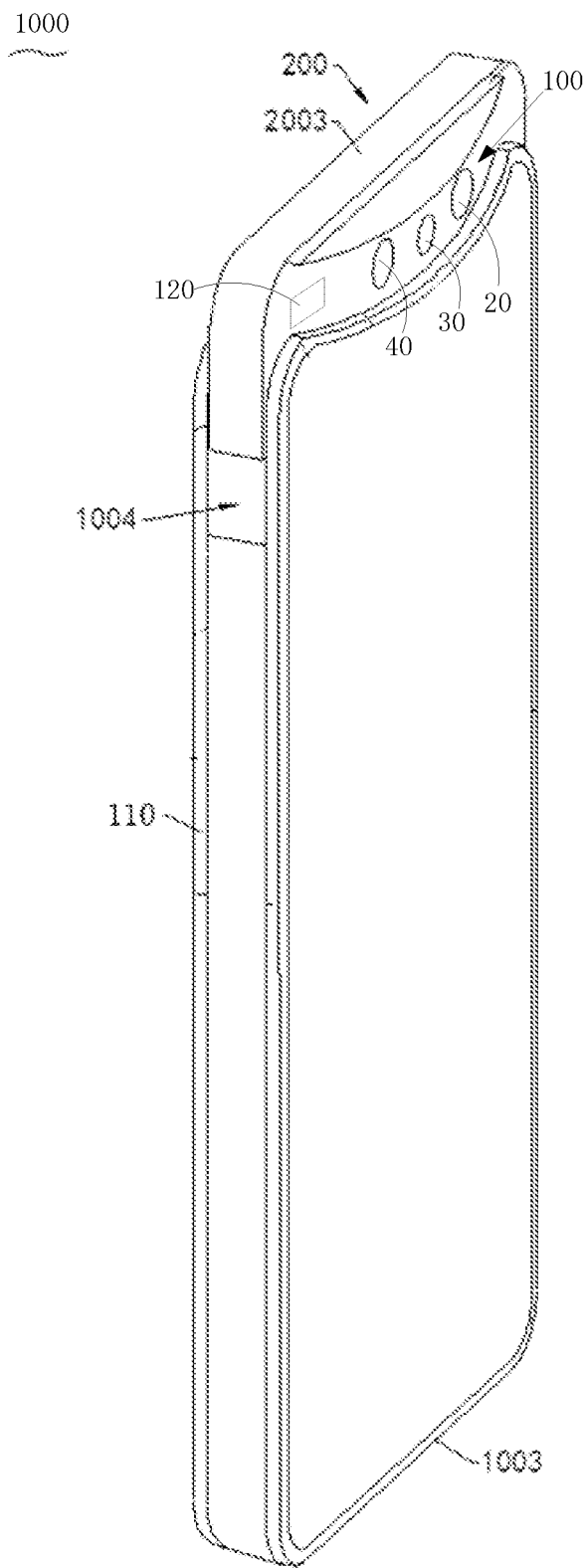
FIG. 2 is a schematic view of an electronic device according to an embodiment of the present disclosure in another state.

Referring to FIGS. 1 and 2, in the embodiments of the present disclosure, an electronic device 1000 includes a body 110 and a sliding module 200. The sliding module 200 is configured to slide between a first position received in the body 110 and a second position exposed from the body 110. The sliding module 200 is arranged with a camera assembly 100 and a gyroscope 120. The camera assembly 100 and the gyroscope 120 are disposed separately. The electronic device 1000 may be configured to control the camera assembly 100 to operate based on feedback data of the gyroscope 120 to realize optical anti-shake shooting.

In the electronic device, the camera assembly 100 and the gyroscope 120 are disposed separately, thereby reducing components in the camera assembly 100 and thus the volume of the camera assembly 100. In addition, the camera assembly 100 and the gyroscope 120 are both disposed in the sliding module 200, such that the gyroscope 120 is close to the camera assembly 100 and may accurately detect a shaking of the camera assembly 100, thereby improving an anti-shake effect of the camera assembly 100.

Exemplarily, the electronic device 1000 may be any one of various types of computer system equipment that is mobile or portable and performs wireless communication (only one form is exemplarily shown in FIG. 1). Specifically, the electronic device 1000 may be a mobile phone or a smart phone (for example, phone based on iPhone™, phone based on Android™), a portable game device (for example, Nintendo DS™, PlayStation Portable™, Gameboy Advance™, iPhone™), a laptop computer, a personal digital assistant (PDA), a portable Internet device, a music player and a data storage device, other handheld devices and devices such as watches, earphones, pendants, headphones, etc. The electronic device 100 may also be other wearable devices (for example, head-mounted devices (HMD) such as electronic glasses, electronic clothes, electronic bracelets, electronic necklaces, electronic tattoos, electronic devices or smart watches).

The electronic device 1000 may also be any one of electronic devices including, but not limited to, cellular phones, smart phones, other wireless communication devices, personal digital assistants, audio players, other media players, music recorders, video recorders, cameras, other media recorders, radios, medical equipments, vehicle transportation instruments, calculators, programmable remote controls, pagers, laptop computers, desktop computers, printers, netbook computers, portable multimedia players (PMP), moving picture experts group (MPEG-1 or MPEG-2) audio layer 3 (MP3) players, portable medical equipment and digital cameras and their combinations.

In some cases, the electronic device 1000 may perform various functions (for example, playing music, displaying videos, storing pictures, and receiving and sending phone calls). If desired, the electronic device 1000 may be a portable device such as a cellular phone, a media player, other handheld devices, a wrist watch device, a pendant device, an earpiece device, or other compact portable devices.

As a typical sensor, the gyroscope 120 may be configured to detect a linear movement of the electronic device 1000 in an axial direction, and measure rotation and deflection movements. For example, the gyroscope 120 may detect a vertical state or a horizontal state of the electronic device 1000, and then the central processor of the electronic device 1000 may control the display screen to rotate based on obtained detection data.

In the embodiments, the gyroscope 120 may be configured to detect the shaking of the sliding module 200 and feedback corresponding data. When the camera assembly 100 is imaging, the gyroscope 120 of the electronic device 1000 is configured to detect the minute shaking generated by the camera assembly 100. The gyroscope 120 then sends the detected shaking data, such as an inclination angle caused by the shaking of the camera assembly 100 or a deviation caused by the inclination, to the processing chip of the electronic device 1000. The processing chip is, for example, a drive chip described below. The processing chip controls the components in the imaging module to move relative to the camera assembly 100 based on the received feedback data of the gyroscope 120 to achieve the anti-shaking.

It can be understood that the gyroscope 120 of the electronic device 1000 is disposed at a position other than the camera assembly 100, thereby saving the space for installing an independent gyroscope in the camera assembly 100. In this way, the size of the camera assembly 100 is similar to that of a conventional camera assembly, and the optical image stabilization may be achieved via the gyroscope 120 of the electronic device 1000, effectively reducing the size of the camera assembly 100 while retaining the image stabilization function.

Specifically, referring to FIGS. 1 and 2, the body 110 further includes a top end surface 1002 and a bottom end surface 1003 disposed opposite to the top end surface 1002. Generally, the top end surface 1002 and the bottom end surface 1003 may extend along a width direction of the body 110. That is, the top end surface 1002 and the bottom end surface 1003 are short sides of the electronic device 1000. The bottom end surface 1003 is configured to arrange a connector, a microphone, a speaker, etc. of the electronic device 1000.

A receiving slot 1004 is defined on the top of the body 110. The receiving slot 1004 is recessed from the top of the body 110 toward the inside of the body 110. The receiving slot 1004 may penetrate the sides of the body 110 along the width direction of the body 110. The sliding module 200 is slidingly connected to the body 110 in the receiving slot 1004. Or to say, the sliding module 200 is slidingly connected to the connecting body 110 to extend or retract the receiving slot 1004.

The sliding module 200 includes a top surface 2003. When the sliding module 200 is in a first position, the top surface 2003 is substantially flush with the top end surface 1002. The sliding module 200 may be connected to a screw mechanism. The screw mechanism may drive the sliding module 200 to slide between the first position and a second position.

It can be understood that when the sliding module 200 protrudes from the receiving slot 1004, the camera assembly 100 is exposed outside the body 110, and the camera assembly 100 may shoot normally.

Figure 3:
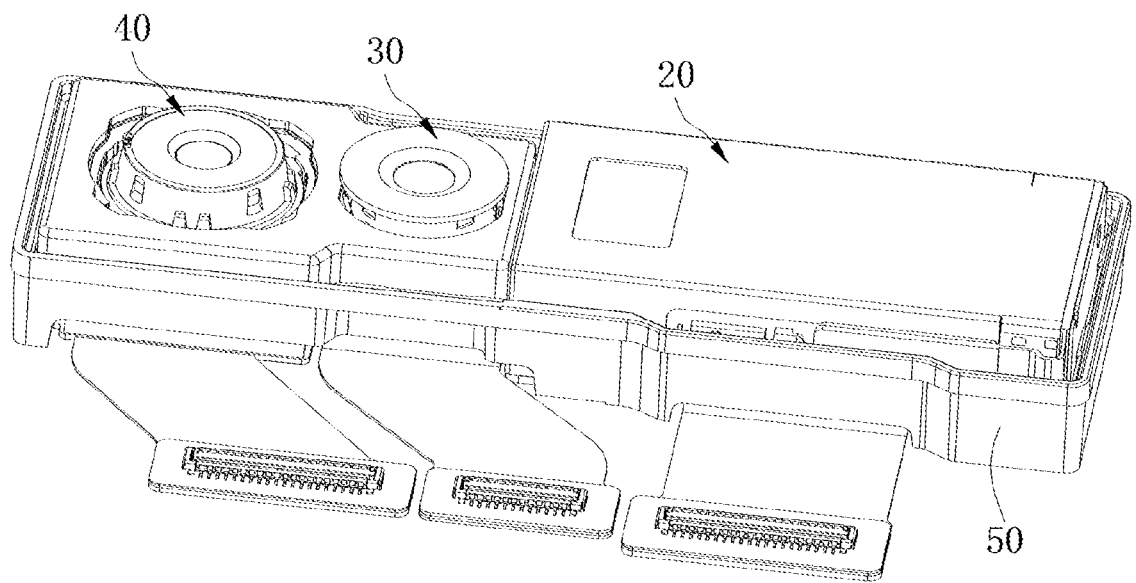
FIG. 3 is a perspective schematic view of a camera assembly according to an embodiment of the present disclosure.

Further referring to FIG. 3, the camera assembly 100 includes a first imaging module 20, a second imaging module 30, a third imaging module 40, and a bracket 50.

The first imaging module 20, the second imaging module 30, and the third imaging module 40 are all disposed in the bracket 50 and fixedly connected to the bracket 50. The bracket 50 may reduce the impact of the first imaging module 20, the second imaging module 30 and the third imaging module 40, and improve the lifespan of the first imaging module 20, the second imaging module 30 and the third imaging module 40.

In the embodiments, the field of view FOV3 of the third imaging module 40 is greater than the FOV1 of the first imaging module 20 and less than the FOV2 of the second imaging module 30. That is, FOV1<FOV3<FOV2. In this way, the three imaging modules with different fields of view enable the camera assembly 100 to meet shooting requirements in different scenes.

In some embodiments, the FOV1 of the first imaging module 20 is 10-30 degrees, the FOV2 of the second imaging module 30 is 110-130 degrees, and the FOV3 of the third imaging module 40 is 80-110 degrees.

For example, the FOV1 of the first imaging module 20 may be 10 degrees, 12 degrees, 15 degrees, 20 degrees, 26 degrees, or 30 degrees. The FOV2 of the second imaging module 30 may be 110 degrees, 112 degrees, 118 degrees, 120 degrees, 125 degrees, or 130 degrees. The FOV3 of the third imaging module 40 may be 80 degrees, 85 degrees, 90 degrees, 100 degrees, 105 degrees, or 110 degrees.

Since the FOV1 of the first imaging module 20 is less, it can be understood that the focal length of the first imaging module 20 is greater. Therefore, the first imaging module 20 may be configured to shoot a distant view, thereby obtaining a clear image of the distant view. The FOV2 of the second imaging module 30 is relatively greater. It can be understood that the focal length of the second imaging module 30 is relatively less. Therefore, the second imaging module 30 may be configured to shoot a close-up view, thereby obtaining a partial close-up image of an object. The third imaging module 40 may be configured to shoot objects normally.

In this way, through the combination of the first imaging module 20, the second imaging module 30, and the third imaging module 40, image effects such as background blurring and picture partial sharpening may be achieved.

The first imaging module 20, the second imaging module 30, and the third imaging module 40 may be disposed side by side. In the embodiments, the first imaging module 20, the second imaging module 30, and the third imaging module 40 are disposed in a line. Further, the second imaging module 30 is disposed between the first imaging module 20 and the third imaging module 40.

Due to the field of view factors of the first imaging module 20 and the third imaging module 40, in order for the first imaging module 20 and the third imaging module 40 to obtain better quality images, the first imaging module 20 and the third imaging module 40 may be arranged with an optical anti-shake device. The optical anti-shake device is generally configured with a number of magnetic elements. Therefore, the first imaging module 20 and the third imaging module 40 may generate a magnetic field.

In the embodiments, the second imaging module 30 is disposed between the first imaging module 20 and the third imaging module 40, such that the first imaging module 20 and the third imaging module 40 may be far away, preventing the magnetic field formed by the first imaging module 20 and the magnetic field formed by the third imaging module 40 to interfere with each other and affect the normal use of the first imaging module 20 and the third imaging module 40.

In other embodiments, the first imaging module 20, the second imaging module 30, and the third imaging module 40 may be disposed not in a same line.

The first imaging module 20, the second imaging module 30, and the third imaging module 40 may be disposed at intervals. Two adjacent imaging modules of the three may abut against each other.

Any one of the first imaging module 20, the second imaging module 30, and the third imaging module 30 may be a black-and-white camera, a red-green-blue (RGB) camera, or an infrared camera.

The processing chip of the electronic device 1000 is configured to control the first imaging module 20 to operate based on the feedback data of the gyroscope 120 to realize optical anti-shake shooting.

Figure 4:
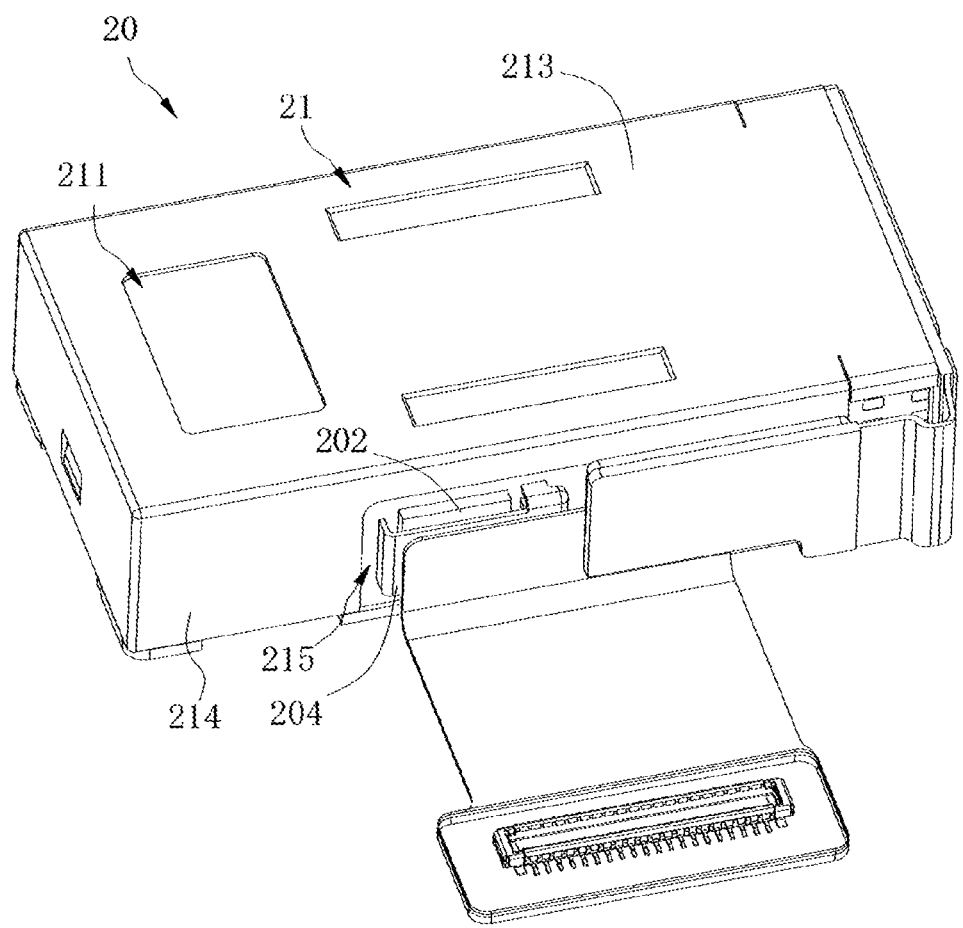
FIG. 4 is a perspective schematic view of a first imaging module according to an embodiment of the present disclosure.
Figure 5:
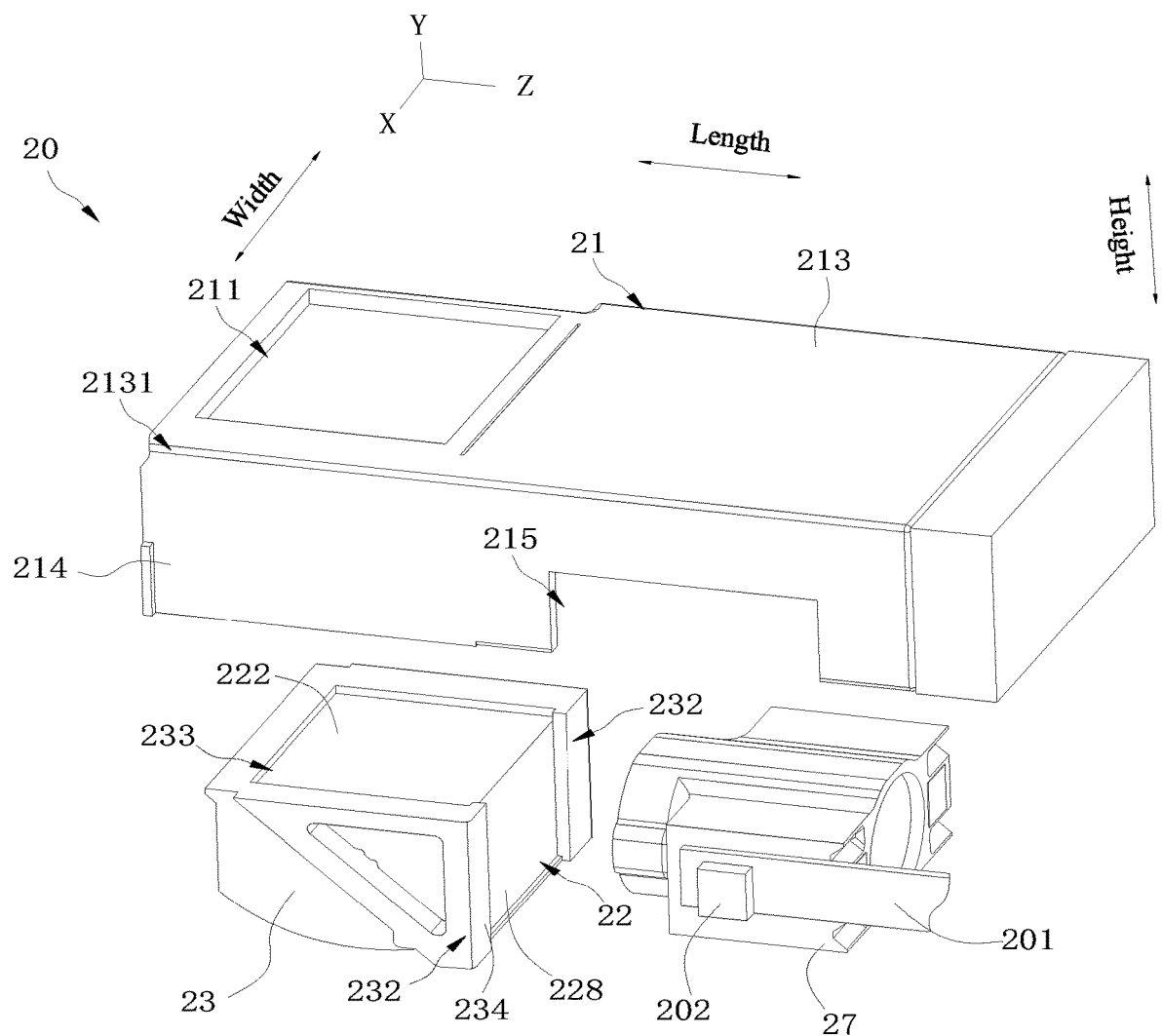
FIG. 5 is an exploded schematic view of a first imaging module according to an embodiment of the present disclosure.
Figure 6:
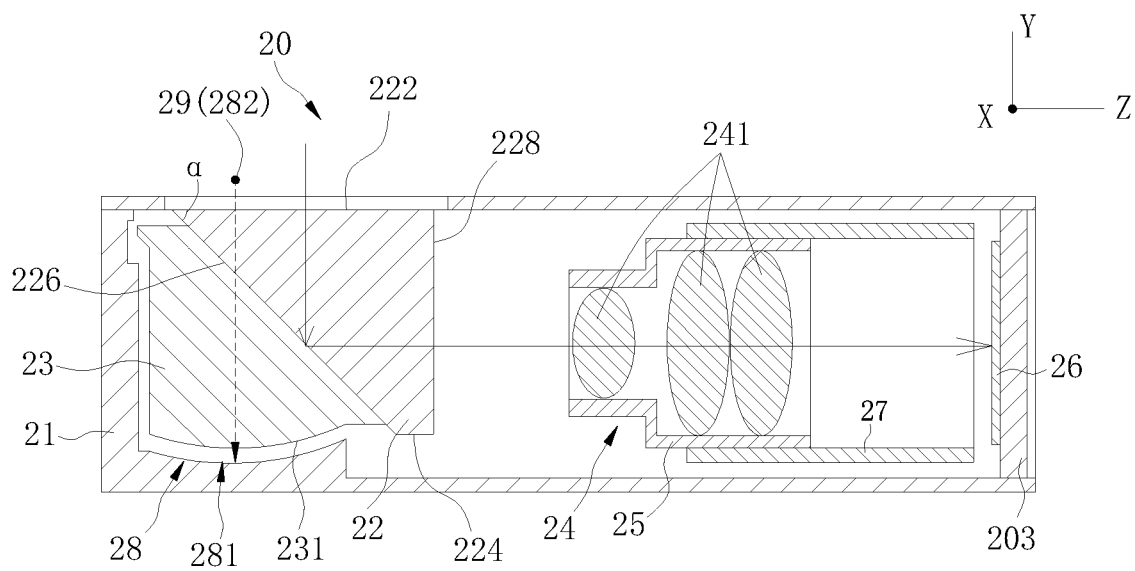
FIG. 6 is a cross-sectional schematic view of a first imaging module according to an embodiment of the present disclosure.
Figure 7:
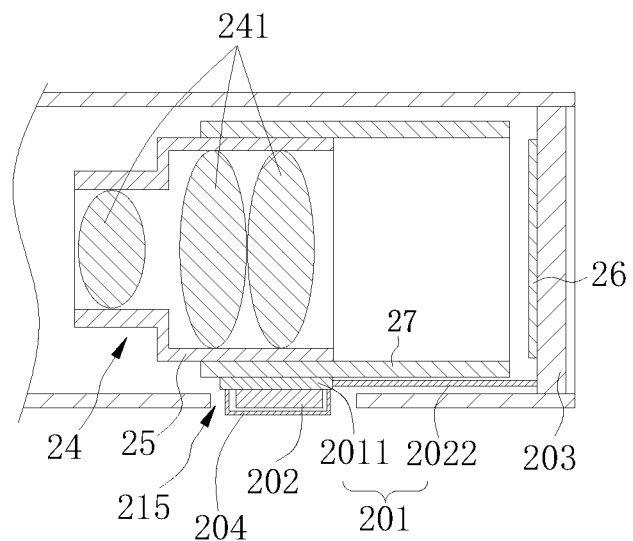
FIG. 7 is a partial cross-sectional schematic view of a first imaging module according to an embodiment of the present disclosure.

Referring to FIGS. 4-6, in the embodiments, the first imaging module 20 includes a housing 21, a reflective element 22, a mounting base 23, a first lens assembly 24, a moving element 25, a first image sensor 26, and a drive mechanism 27.

The reflective element 22, the mounting base 23, the first lens assembly 24, and the moving element 25 are all disposed in the housing 21. The reflective element 22 is disposed on the mounting base 23, and the first lens assembly 24 is fixed to the moving element 25. The moving element 25 is disposed at a side of the first image sensor 26. Further, the moving element 25 is disposed between the reflective element 22 and the first image sensor 26.

The drive mechanism 27 is connected to the moving element 25 and the housing 21. After the incident light enters the housing 21, the incident light is redirected by the reflective element 22, and then passes through the first lens assembly 24 to reach the first image sensor 26, such that the first image sensor 26 obtains an external image. The drive mechanism 27 is configured to drive the moving element 25 to move along an optical axis of the first lens assembly 24.

The housing 21 has a substantially square shape. The housing 21 includes a light inlet 211 from which the incident light enters the first imaging module 20. That is, the reflective element 22 is configured to redirect the incident light incident from the light inlet 211, and the incident light passes through the first lens assembly 24 to reach the first image sensor 26, such that the first image sensor 26 senses the incident light outside the first imaging module 20.

Therefore, it can be understood that the first imaging module 20 is a periscope lens module. Compared with a vertical lens module, the height of the periscope lens module is less, such that the overall thickness of the electronic device 1000 may be reduced. The vertical lens module refers to that the optical axis of the lens module is a straight line, or that the incident light is transmitted to a photosensitive device of the lens module along a direction of the linear optical axis.

It can be understood that the camera assembly 100 defines a though hole, and the light inlet 211 is exposed through the through hole such that external light passes through the through hole and enters the first imaging module 20 from the light inlet 211.

Specifically, referring to FIG. 5, the housing 21 includes a top wall 213 and a side wall 214. The side wall 214 extends from a side 2131 of the top wall 213. The top wall 213 includes two opposite sides 2131. The number of the side walls 214 is two, and each side wall 214 extends from a corresponding side 2131, or the side walls 214 are respectively connected to the top wall 213 on both sides. The light inlet 211 is defined on the top wall 213.

The reflective element 22 is a prism or a plane mirror. In one example, when the reflective element 22 is a prism, the prism may be a triangular prism. A cross-section of the prism is a right triangle. The light may be incident from one of the right edges of the right triangle, reflected by the beveled edge, and then emitted from the other right angle edge. It can be understood that the incident light may be refracted by the prism and emitted without reflection. The prism may be made of glass, plastic and other materials with better light transmission. In one embodiment, a reflective material such as silver may be coated on a surface of the prism to reflect the incident light.

It can be understood that when the reflective element 22 is a plane mirror, the plane mirror reflects the incident light so as to achieve the redirecting of the incident light.

Figure 9:
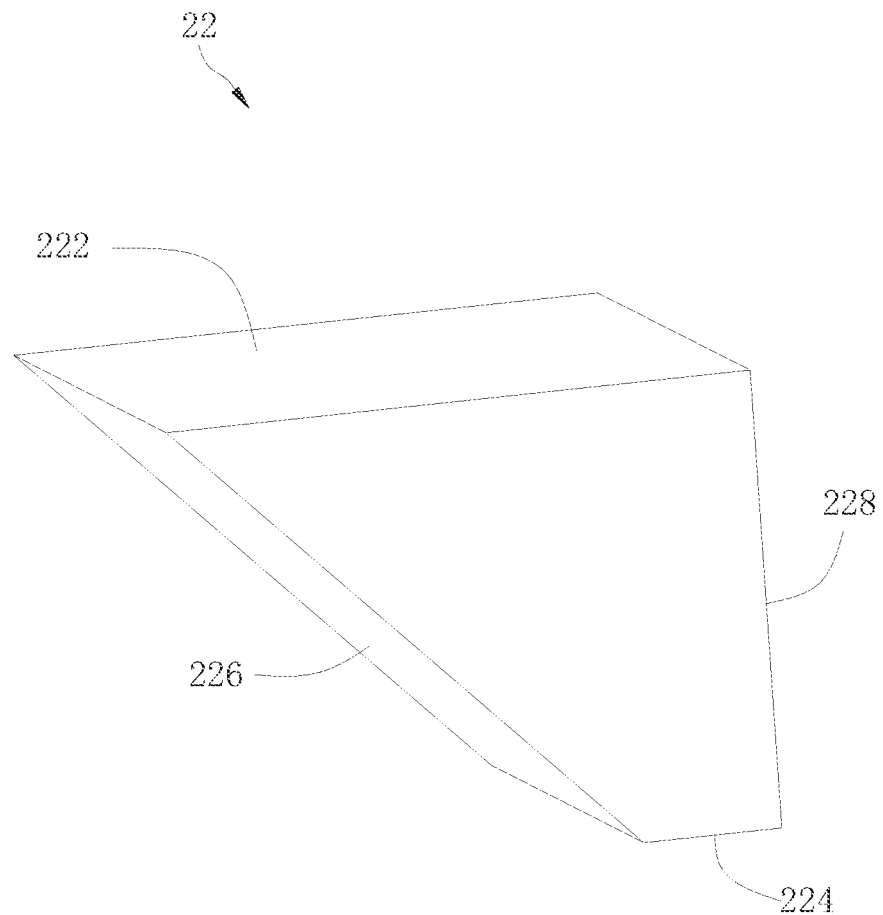
FIG. 9 is a perspective schematic view of a reflective element according to an embodiment of the present disclosure.

For more details, reference may be made to FIGS. 6 and 9. The reflective element 22 has a light incident surface 222, a backlight surface 224, a light reflective surface 226 and a light emitting surface 228. The light incident surface 222 is close to and faces the light inlet 211. The backlight surface 224 is away from the light inlet 211 and opposite to the light incident surface 222. The light reflective surface 226 is connected to the light incident surface 222 and the backlight surface 224. The light emitting surface 228 is connected to the light incident surface 222 and the backlight surface 224. The light emitting surface 228 faces the first image sensor 26. The light reflective surface 226 is inclined relative to the light incident surface 222. The light emitting surface 228 is opposite to the light reflective surface 226.

Specifically, during a light conversion process, the light passes through the light inlet 211, enters the light reflective element 22 from the light incident surface 222, is reflected by the light reflecting surface 226, and finally emits out of the light reflective element 22 from the light emitting surface 228 to complete the light conversion process. The backlight surface 224 and the mounting base 23 are fixedly arranged, such that the reflective element 22 remains stable.

Figure 10:
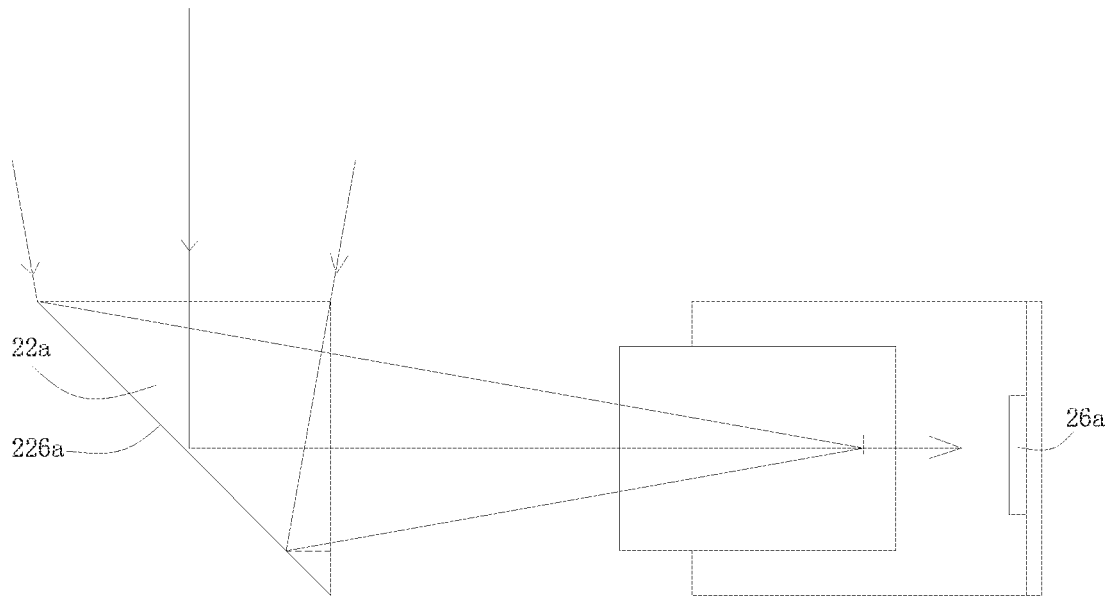
FIG. 10 is a schematic view of light reflection imaging of an imaging module in the related art.

As shown in FIG. 10, in the related art, due to the need to reflect incident light, the light reflective surface 226a of the reflective element 22a is inclined relative to the horizontal direction, and the reflective element 22a has an asymmetric structure in the light reflection direction. In this way, the actual optical area of a lower part of the reflective element 22a is less than that of an upper part of the reflective element 22a. It can be understood that the part of the light reflective surface 226a away from the light inlet is less or cannot reflect light.

Figure 11:
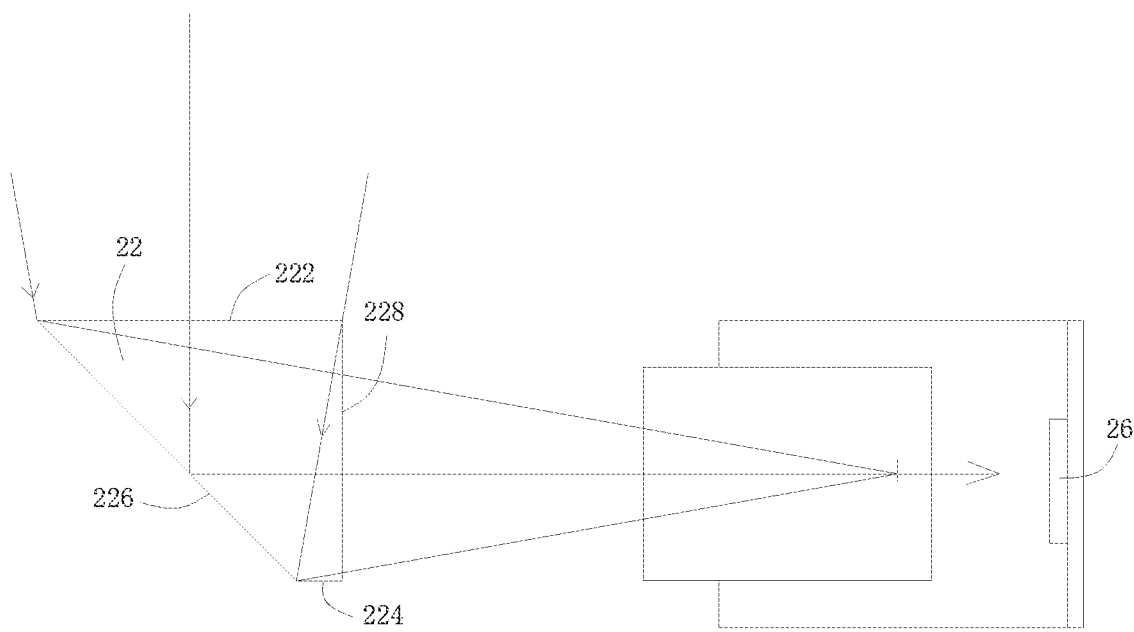
FIG. 11 is a schematic view of light reflection imaging of a first imaging module according to an embodiment of the present disclosure.

Therefore, referring to FIG. 11, in the reflective element 22 according to the embodiments of the present disclosure, a corner away from the light inlet is cut off compared with the reflective element 22a in the related art. In this way, the reflected light effect of the reflective element 22 retains unaffected, and the overall thickness of the reflective element 22 may be reduced.

Referring to FIG. 6, in some embodiments, an included angle α between the light reflective surface 226 and the light incident surface 222 is 45 degrees.

In this way, the incident light may be better reflected and converted, and a better light conversion effect may be achieved.

The reflective element 22 may be made of glass, plastic, or other materials with good light transmittance. In some embodiments, a reflective material such as silver may be coated on a surface of the reflective element 22 to reflect incident light.

In some embodiments, the light incident surface 222 is disposed substantially parallel to the backlight surface 224.

In this way, when the backlight surface 224 and the mounting base 23 are fixedly arranged, the reflective element 22 may be kept stable. Moreover, the light incident surface 222 appears as a flat surface. In this way, the conversion process of the incident light in the reflective element 22 forms a regular optical path, such that the light conversion efficiency is better. Specifically, along a light inlet direction of the light inlet 211, the cross section of the reflective element 22 is substantially trapezoidal. Or to say, the reflective element 22 is substantially trapezoidal.

In some embodiments, both the light incident surface 222 and the backlight surface 224 are substantially perpendicular to the light emitting surface 228.

In this way, a relatively regular reflective element 22 may be formed, such that the optical path of the incident light is straight, and the conversion efficiency of the light is improved.

In some embodiments, the distance between the light incident surface 222 and the backlight surface 224 ranges from 4.8 to 5.0 mm.

Specifically, the distance between the light incident surface 222 and the backlight surface 224 may be 4.85 mm, 4.9 mm, 4.95 mm, or the like. Or to say, it can be understood that the height of the reflective element 22 may be 4.8-5.0 mm. The reflective element 22 formed by the light incident surface 222 and the backlight surface 224 in the above distance range has a moderate volume, and may be better integrated into the first imaging module 20 to form a more compact first imaging module 20, camera assembly 100 and electronic device 1000, such that more consumer demands may be satisfied.

In some embodiments, the light incident surface 222, the backlight surface 224, the light reflective surface 226, and the light emitting surface 228 are all hardened to form a hardened layer.

When the reflective element 22 is made of glass or the like, the material of the reflective element 22 is relatively brittle. In order to improve the strength of the reflective element 22, the light incident surface 222, the backlight surface 224, the light reflective surface 226 and the light emitting surface 228 of the reflective element 22 may be treated with hardening treatment. Furthermore, all surfaces of the reflective element may be treated with hardening treatment to further improve the strength of the reflective element. The hardening treatments may be such as infiltration of lithium ions, filming the above surfaces without affecting the conversion of light by the reflective element 22, etc.

In one example, the reflective element 22 redirects the incident light incident from the light inlet 211 at an angle of 90 degrees. For example, the incident angle of incident light on the light reflective surface 226 of the reflective element 22 is 45 degrees, and the reflection angle is also 45 degrees. Of course, the angle at which the reflective element 22 redirects the incident light may be other angles, such as 80 degrees, 100 degrees, etc., as long as the incident light can be redirected to reach the first image sensor 26.

In the embodiments, the number of the reflective element 22 is one. The incident light is transmitted to the first image sensor 26 after being redirected once. In other embodiments, the number of the light reflective elements 22 is multiple. The incident light is transmitted to the first image sensor 26 after being redirected at least twice.

The mounting base 23 is configured to mount the reflective element 22, or the mounting base 23 is a carrier of the reflective element 22. The reflective element 22 is fixed on the mounting base 23. In this way, the position of the reflective element 22 may be determined, which is advantageous for the reflective element 22 to reflect or refract incident light. The reflective element 22 may be fixed on the mounting base 23 by viscose to achieve a fixed connection with the mounting base 23.

Specifically, in the embodiments, the mounting base 23 is arranged with a limiting structure 232 connected to the reflective element 22 to limit the position of the reflective element 22 on the mounting base 23.

In this way, the reflective element 22 may not be deviated in position under impact, which is beneficial to the normal use of the first imaging module 20.

It can be understood that in one example, the reflective element 22 is fixed on the mounting base 23 by means of bonding. In a case of the limiting structure 232 being omitted, when the first imaging module 20 is impacted, if the adhesive force between the reflective element 2222 and the mounting base 23 is insufficient, the reflective element 22 may be detached from the mounting base 23.

In the embodiments, the mounting base 23 defines a mounting groove 233. The reflective element 22 is disposed in the mounting groove 233. The limiting structure 232 is disposed at an edge of the mounting groove 233 and abuts against the reflective element 22.

In this way, the mounting groove 233 may enable the reflective element 22 to be easily mounted on the mounting base 23. The limiting structure 232 is disposed at the edge of the mounting groove 233 and abuts against the edge of the reflective element 22, thereby restricting the position of the reflective element 22, while not preventing the reflective element 22 from emitting incident light to the first image sensor 26.

Further, the limiting structure 232 includes a protrusion 234 protruding from the edge of the mounting groove 233 and abutting against an edge of the light emitting surface 228. Since the reflective element 22 is mounted on the mounting base 23 through the light reflective surface 226, and the light emitting surface 228 is disposed opposite to the light reflective surface 226, the reflective element 22 is thus prone to generating a position deviation toward the side of the light emitting surface 228 when subjected to an impact. In the embodiments of the present disclosure, the limiting structure 232 abuts against the edge of the light-emitting surface 228, which may prevent the reflective element 22 from shifting to the light-emitting surface 228 side and ensure that the light emits from the light emitting surface 228 normally.

Of course, in other embodiments, the limiting structure 232 may include other structures as long as the position of the reflective element 22 can be limited. For example, the limiting structure 232 may define a clamping slot, and the reflective element 22 is further arranged with a limiting column. The limiting column may be engaged in the clamping slot to limit the position of the reflective element 22.

In some embodiments, the protrusion 234 is substantially strip-shaped and extends along the edge of the light emitting surface 228. In this way, the contact area between the protrusion 234 and the edge of the light emitting surface 228 is large, such that the reflective element 22 may be more firmly disposed on the mounting base 23.

Of course, in other embodiments, the protrusion 234 may also have a substantially block-like structure.

Referring to FIG. 5 again, in one example, the mounting base 23 may be movably disposed in the housing 21, and the mounting base 23 may rotate relative to the housing 21 to adjust the direction in which the reflective element 22 redirects the incident light.

The mounting base 23 may drive the reflective element 22 to rotate toward the opposite direction of the shaking of the first imaging module 20, thereby compensating an incident deviation of the incident light of the light inlet 211, and achieving the anti-shaking.

The first lens assembly 24 is received in the moving element 25. Further, the first lens assembly 24 is disposed between the reflective element 22 and the first image sensor 26. The first lens assembly 24 is configured to image incident light on the first image sensor 26. In this way, the first image sensor 26 may obtain images with better quality.

When the first lens assembly 24 moves integrally along its optical axis, the first lens assembly 24 may image on the first image sensor 26, such that the first imaging module 20 can focus. The first lens assembly 24 includes a plurality of lenses 241. When at least one of the lenses 241 moves, the overall focal length of the first lens assembly 24 changes, thereby achieving the zooming function of the first imaging module 20. More, the drive mechanism 27 may drive the moving element 25 to move in the housing 21 to achieve zooming.

Figure 8:
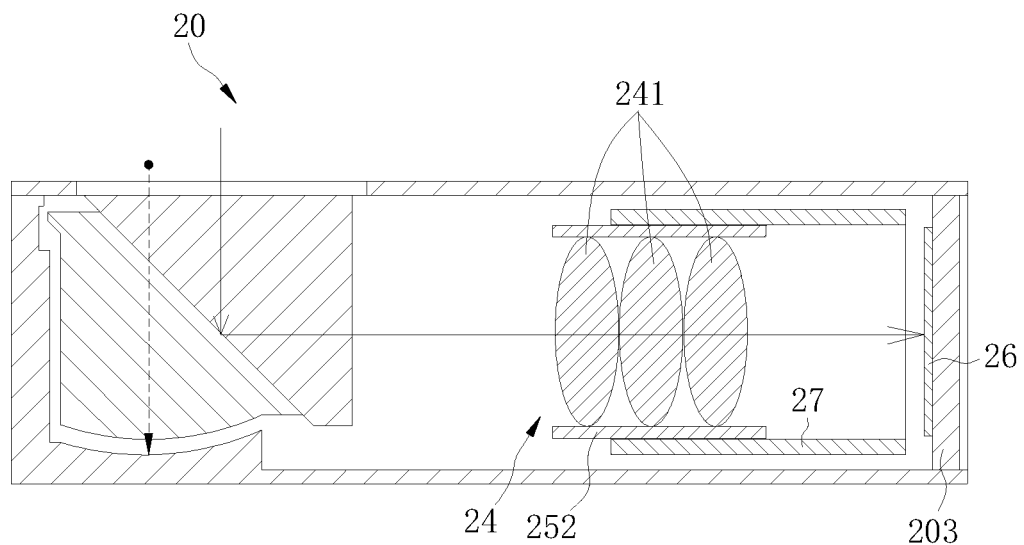
FIG. 8 is a cross-sectional schematic view of a first imaging module according to another embodiment of the present disclosure.

As shown in FIG. 6, in some embodiments, the moving element 25 is substantially cylindrical. The plurality of lenses 241 in the first lens assembly 24 may be fixed in the moving element 25 along the axial direction of the moving element 25 at intervals. As shown in FIG. 8, the moving element 25 may include two clips 252 clamping the lenses 241 between the two clips 252.

It can be understood that since the moving element 25 is configured to fix the plurality of lenses 241, the length of the required moving element 25 is large. The moving element 25 may be cylindrical, square, etc., having a shape of a certain cavity, such that the moving element 25 is arranged in a tube, and the plurality of lenses 241 may be better arranged and better protected in the cavity. In this way, the lenses 241 are less likely to shake.

In addition, as shown in FIG. 8, the moving element 25 clamps the plurality of lenses 241 between the two clips 252, which not only has a certain stability, but also reduces the weight of the moving element 25, thereby reducing the power required by the drive mechanism 27 to drive the moving element 25. Moreover, the design difficulty of the moving element 25 is also relatively low, and the lenses 241 are also easier to be arranged on the moving element 25.

Of course, the moving element 25 is not limited to the cylindrical shape and the two clips 252 mentioned above. In other embodiments, the moving element 25 may include three, four or more clips 252 to form a more stable structure. Or, the moving element 25 may include one clip 252 to form a simpler structure. Or, a rectangular body, a circular body, or other various regular or irregular shapes having a cavity may be arranged to receive the lenses 241. On the premise of ensuring the normal imaging and operation of the imaging module, specific selection may be made.

The first image sensor 26 may be adopted with a complementary metal oxide semiconductor (CMOS) photosensitive element or a charge-coupled device (CCD) photosensitive element.

In some embodiments, the drive mechanism 27 may be an electromagnetic drive mechanism, a piezoelectric drive mechanism, or a memory alloy drive mechanism.

Specifically, the electromagnetic drive mechanism includes a magnetic field and a conductor. If the magnetic field moves relative to the conductor, an induced current is generated in the conductor. The induced current causes the conductor to be subjected to an ampere force, which causes the conductor to move. The conductor herein refers to a part of the electromagnetic drive mechanism that drives the moving element 25 to move. The piezoelectric drive mechanism is based on an inverse piezoelectric effect of piezoelectric ceramic materials: if a voltage is applied to a piezoelectric material, mechanical stress is generated. That is, electrical energy and mechanical energy are converted, controlling a mechanical deformation of the piezoelectric material to produce rotation or linear motion, which has the advantages of simple structure and low speed.

The drive of the memory alloy drive mechanism is based on characteristics of the shape memory alloy. The shape memory alloy is a special alloy. Once the shape memory alloy remembers any shape, even if deforming, the shape memory alloy can be restored to the shape before deformation when heated to certain temperature to achieve the purpose of driving. The solutions above have characteristics of rapid displacement and free direction.

Referring to FIG. 6 again, the first imaging module 20 further includes a drive device 28. The drive device 28 is configured to drive the mounting base 23 with the reflective element 22 to rotate around a rotation axis 29. The drive device 28 is configured to drive the mounting base 23 to move in an axial direction of the rotation axis 29. The rotation axis 29 may be perpendicular to the optical axis of the light inlet 211 and the photosensitive direction of the first image sensor 26, such that the first imaging module 20 may realize optical anti-shaking in the optical axis of the light inlet 211 and the axis of the rotation axis 29.

In this way, since the volume of the reflective element 22 is smaller than that of the lens barrel, the drive device 28 drives the mounting base 23 to move in two directions, which may realize the optical anti-shaking effect of the first imaging module 20 in two directions, and enable the volume of the first imaging module 20 to be smaller.

Referring to FIGS. 5 to 6, for convenience of description, the width direction of the first imaging module 20 is defined as an X direction, the height direction is defined as a Y direction, and the length direction is defined as a Z direction. Thus, the optical axis of the light inlet 211 is in the Y direction, the light receiving direction of the first image sensor 26 is in the Z direction, and the axial direction of the rotation axis 29 is in the X direction.

The drive device 28 drives the mounting base 23 to rotate, such that the reflective element 22 rotates around the X direction, thereby the first imaging module 20 realizing the optical anti-shaking effect in the Y direction. In addition, the drive device 28 drives the mounting base 23 to move in the axial direction of the rotation axis 29, such that the first imaging module 20 realizes the optical anti-shaking effect in the X direction. In addition, the first lens assembly 24 may be disposed along the Z direction to enable the first lens assembly 24 to focus on the first image sensor 26.

Specifically, when the reflective element 22 rotates in the X direction, the light reflected by the reflective element 22 moves in the Y direction, such that the first image sensor 26 forms a different image in the Y direction to achieve the anti-shaking effect in the Y direction. When the reflective element 22 moves in the X direction, the light reflected by the reflective element 22 moves in the X direction, such that the first image sensor 26 forms a different image in the X direction to achieve the anti-shaking effect in the X direction.

In some embodiments, the drive device 28 is formed with an arc-shaped guide rail 281. The drive device 28 is configured to drive the mounting base 23 to rotate along the arc-shaped guide rail 281 around a central axis 282 of the arc-shaped guide rail 281 and the moves along an axis direction of the central axis 282. The central axis 282 may coincide with the rotation axis 29.

It can be understood that the drive device 28 is configured to drive the mounting base 23 to rotate along the arc-shaped guide rail 281 around the central axis 282 of the arc-shaped guide rail 281 and move along the axis direction of the central axis 282.

In this way, since the drive device 28, configured with the curved guide rail 281, drives the mounting base 23 with the reflective element 22 to rotate together, the friction between the drive device 28 and the mounting base 23 is less, such that the mounting base 23 may rotate smoothly, thereby improving the optical anti-shaking effect of the first imaging module 20.

Figure 12:
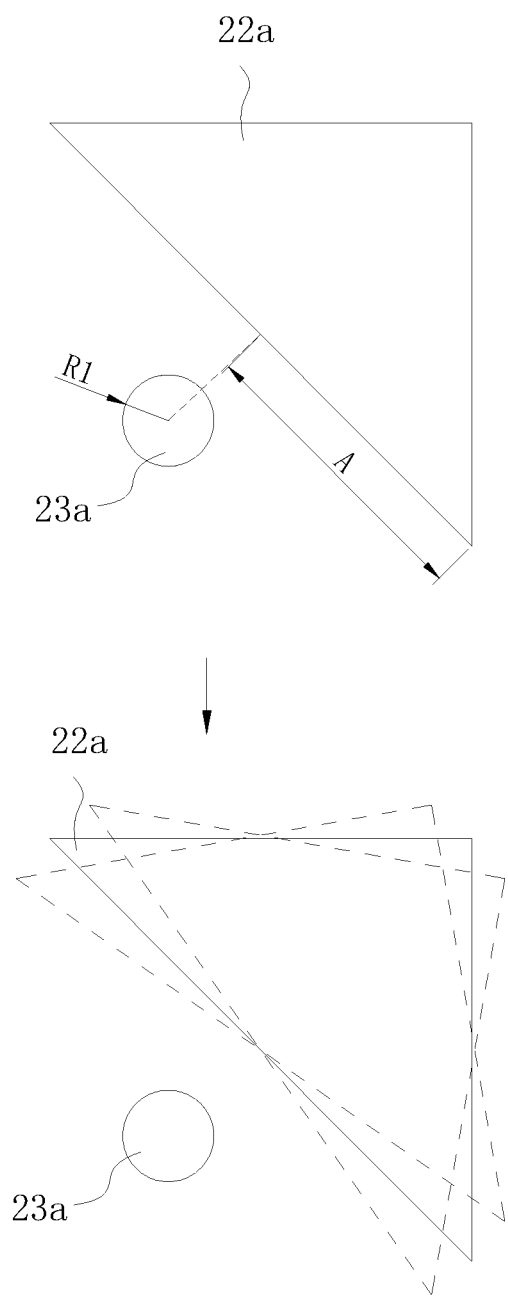
FIG. 12 is a structural schematic view of an imaging module in the related art.

Specifically, referring to FIG. 12, in the related art, the mounting base (not shown) is rotatably connected to the rotating shaft 23a. The mounting base rotates around the rotating shaft 23a to drive the reflective element 22a to rotate together. Assume that the friction force is f1, the radius of the rotating shaft 23a is R1, the thrust force is F1, and the radius of rotation is A. Then the ratio K1 of the friction torque to the thrust torque may be represented as: $K1=f1R1/F1A$. Since the reflective element 22a only needs to rotate slightly when performing anti-shaking, F1 cannot be too large, because the excessive rotation of F1 will cause the rotation of the reflective element 22a to be too large to achieve the anti-shaking function. The imaging module is required to be light and short, causing that the size of the element 22a cannot be too large, the space for increasing A is therefore also limited, such that the influence of friction cannot be further eliminated.

Figure 13:
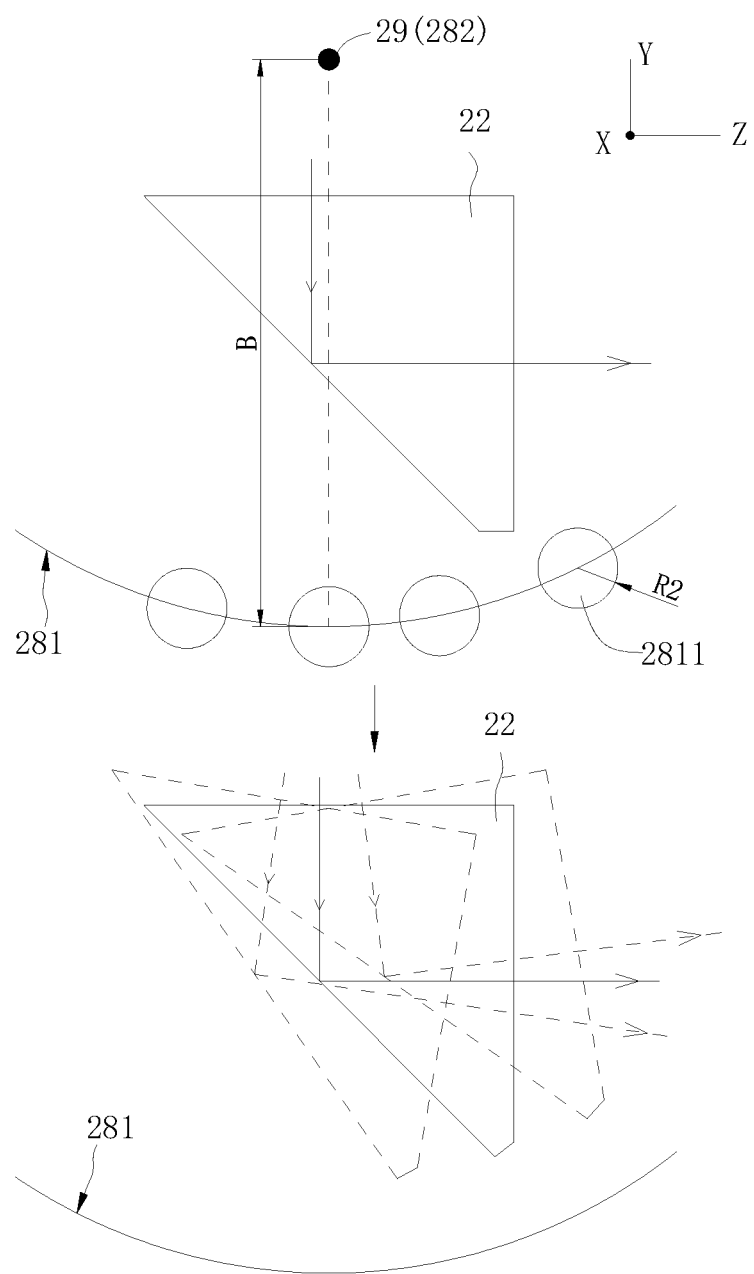
FIG. 13 is a structural schematic view of a first imaging module according to an embodiment of the present disclosure.

Referring to FIG. 13, in the present disclosure, the mounting base 23 rotates along the arc-shaped guide rail 281, and the arc-shaped guide rail 281 may include a plurality of rolling bodies 2811 arranged in sequence. The radius of the rolling element 2811 is R2, and the rotating radius of the reflective element 22 is B. The ratio K2 of the friction torque to the rotating torque may be represented as: $K2=f2R2/F2B$. In cases where f1 is not significantly changed compared to f2, R1 is not significantly changed compared to R2, and F1 is not significantly changed compared to F2, due to the adoption of an orbital swinging method to rotate, the corresponding rotating radius becomes B, and B may not be limited by the size of the reflective element 22 and can even be several times more than A. Therefore, in the cases, the influence of friction on the rotation of the reflective element 22 may be greatly reduced (K2 is reduced), thereby improving the rotational accuracy of the reflective element 22, and enabling the optical anti-shaking effect of the first imaging module 20 better.

Referring to FIG. 6, in some embodiments, the mounting base 23 includes an arc-shaped surface 231 concentrically disposed with the arc-shaped guide rail 281 and cooperates with the arc-shaped guide rail 281. Or to say, the center of the arc-shaped surface 231 coincides with the center of the arc-shaped guide 281. In this way, the mounting base 23 and the drive device 28 may be more compact.

In some embodiments, the central axis 282 is outside the first imaging module 20. In this way, the radius R2 of the arc-shaped guide rail 281 is large, thereby reducing the adverse effect of friction on the rotation of the mounting base 23.

In some embodiments, the drive device 28 is disposed at a bottom of the housing 21. Or to say, the drive device 28 and the housing 21 are of a uniform structure. In this way, the structure of the first imaging module 20 is more compact.

In some embodiments, the drive device 28 electromagnetically drives the mounting base 23 to rotate. In one example, the drive device 28 is arranged with a coil, and an electromagnetic sheet is fixed on the mounting base 23. After the coil is energized, the coil can generate a magnetic field to drive the electromagnetic sheet to move, thereby driving the mounting base 23 and the reflective element to rotate together.

Of course, in other embodiments, the drive device 28 may drive the mounting base 23 in a piezoelectric driving manner or a memory alloy driving manner. For the piezoelectric driving method and the memory alloy driving method, reference may be made to the above description, which will not be repeated here.

Referring to FIGS. 4-7 again, the first imaging module 20 further includes a chip circuit board 201 and a drive chip 202. The chip circuit board 201 is fixed on a side surface of the drive mechanism 27, and the drive chip 202 is fixed on a side of the chip circuit board 201 opposite to the drive mechanism 27. The drive chip 202 is electrically connected to the drive mechanism 27 through the chip circuit board 201.

In this way, the drive chip 202 is fixed to the side surface of the drive mechanism 27 through the chip circuit board 201, and is electrically connected to the drive mechanism 27 through the chip circuit board 201, such that the structure between the drive chip 202 and the drive mechanism 27 may be more compact, which is beneficial to reduce the volume of the first imaging module 20.

Specifically, the drive chip 202 is configured to control the drive mechanism 27 to drive the moving element 25 to move along the optical axis of the first lens assembly 24, such that the first lens assembly 24 is focused and imaged on the first image sensor 26. The drive chip 202 is configured to control the drive device 28 based on the feedback data of the gyroscope 120 to drive the mounting base 23 with the reflective element 22 to rotate around the rotation axis 29. The drive chip 202 is also configured to control the drive device 28 to drive the mounting base 23 to move along the axis of the rotation axis 29 based on the feedback data of the gyroscope 120.

The drive chip 202 is also configured to control the drive device 28 based on the feedback data of the gyroscope 120 to drive the mounting base 23 to rotate along the arc-shaped guide rail 281 around the central axis 282 of the arc-shaped guide rail 281 and move along the axis direction of the central axis 282.

In some embodiments, the first imaging module 20 includes a sensor circuit board 203. The first image sensor 26 is fixed to the sensor circuit board 203. The chip circuit board 201 includes a mounting portion 2011 and a connecting portion 2022. The mounting portion 2011 is fixed to the side surface of the drive mechanism 27. The drive chip 202 is fixed to the mounting portion 2011. The connecting portion 2022 connects the mounting portion 2011 and the sensor circuit board 203.

In this way, the drive chip 202 may be electrically connected to the first image sensor 26 through the sensor circuit board 203. Specifically, the connecting portion 2022 may be fixedly connected to the sensor circuit board 203 by soldering.

In one example, when assembling the first imaging module 20, the drive chip 202 may be fixed on the chip circuit board 201 first, and the chip circuit board 201 with the drive chip 202 may be connected to the sensor circuit board 203 by soldering. Finally, the chip circuit board 201 with the drive chip 202 is fixed on the side surface of the drive mechanism 27.

The chip circuit board 201 may be fixedly connected to the drive mechanism 27 by soldering, bonding, or the like.

It should be noted that fixing the chip circuit board 201 on the side surface of the drive mechanism 27 may refer to that the chip circuit board 201 is in contact with and fixed to the side surface of the drive mechanism 27; or may refer to that the chip circuit board 201 is fixedly connected to the side surface of the drive mechanism 27 through other components.

In the embodiments, the mounting portion 2011 may be a rigid circuit board, the connecting portion 2022 may be a flexible circuit board, and the mounting portion 2011 is attached to the side surface of the drive mechanism 27.

In this way, the mounting portion 2011 as a rigid circuit board has good rigidity and is not easily deformed, which is beneficial to the fixed connection between the mounting portion 2011 and the side surface of the drive mechanism 27. The mounting portion 2011 may be attached to the side surface of the drive mechanism 27 by adhesion. In addition, the connecting portion 2022 as a flexible circuit board is easily deformed, such that the chip circuit board 201 is easily mounted on the side surface of the drive mechanism 27.

Of course, in other embodiments, the mounting portion 2011 may also be a flexible circuit board.

In some embodiments, the housing 21 may define an escape hole 215. The drive chip 202 is at least partially disposed in the escape hole 215 to be exposed to the housing 21. In this way, the drive chip 202 penetrates the housing 21 such that there is an overlap between the drive chip 202 and the housing 21. In this way, the structure between the drive chip 202 and the housing 21 may be more compact, further reducing the volume of the first imaging module 20.

It can be understood that when there is a gap between the side surface of the drive mechanism 27 and the housing 21, the drive chip 202 is partially disposed in the escape hole 215.

In some embodiments, the shape and size of the escape hole 215 match the shape and size of the drive chip 202 respectively. For example, the size of the escape hole 215 is slightly larger than the size of the drive chip 202, and the shape of the escape hole 215 is the same as the shape of the drive chip 202.

In the embodiments, the escape hole 215 is formed on the side wall 214 of the housing 21. It can be understood that the escape hole 215 penetrates the inside and outside of the side wall 214. Of course, in other embodiments, the escape hole 215 may be formed on the top wall 213 of the housing 21.

In some embodiments, the first imaging module 20 further includes a shielding cover 204 fixed to the chip circuit board

201 and covering the drive chip 202. In this way, the shielding cover 204 may protect the drive chip 202 and prevent the drive chip 202 from being physically impacted. In addition, the shielding cover 204 may also reduce the electromagnetic influence on the drive chip 202.

The shielding cover 204 may be made of metal material. For example, the material of the shielding cover 204 may be stainless steel. In the embodiments, the chip circuit board 201 is fixed to the mounting portion 2011. In some embodiments, the mounting portion 2011 is a rigid circuit board or a plate material combining a flexible circuit board and a reinforcement board.

Figure 14:
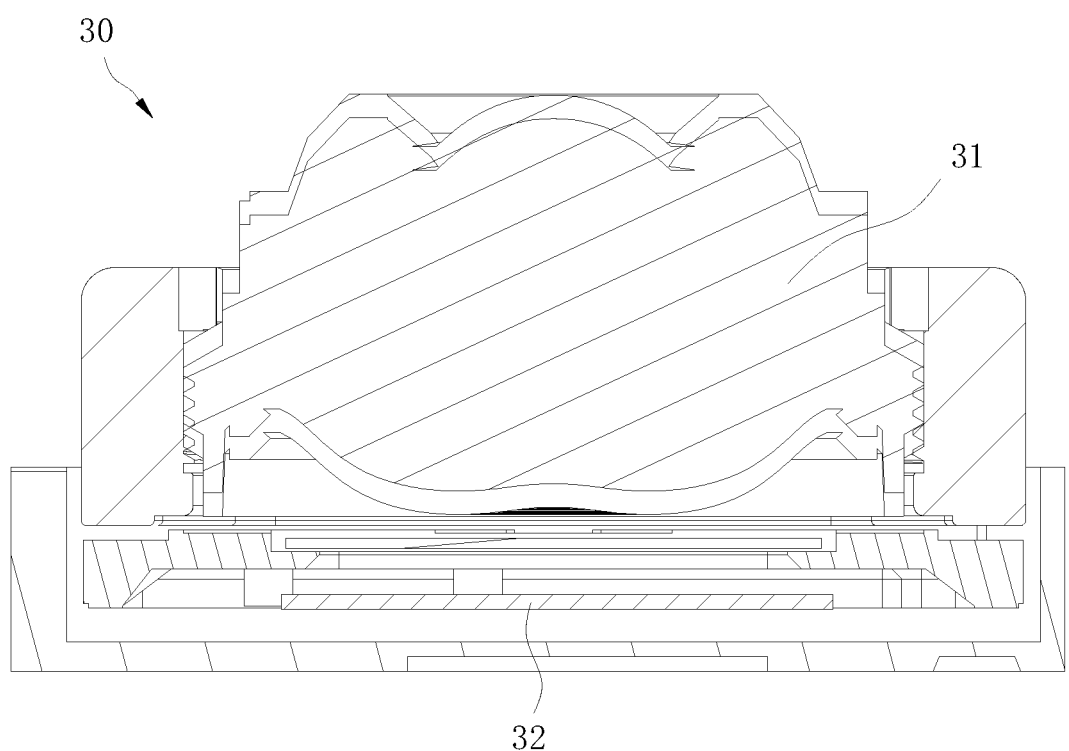
FIG. 14 is a cross-sectional schematic view of a second imaging module according to an embodiment of the present disclosure.

Referring to FIG. 14, in the embodiments, the second imaging module 30 is a vertical lens module. Of course, in other embodiments, the second imaging module 30 may also be a periscope lens module.

The second imaging module 30 includes a second lens assembly 31 and a second image sensor 32. The second lens assembly 31 is configured to image light on the second image sensor 32. An incident optical axis of the second imaging module 30 and an optical axis of the second lens assembly 31 coincides.

In the embodiments, the second imaging module 30 may be a fixed-focus lens module. Therefore, there are fewer lenses 241 of the second lens assembly 31, such that the height of the second imaging module 30 is lower, which is beneficial to reducing the thickness of the electronic device 1000.

The type of the second image sensor 32 may be the same as that of the first image sensor 26, which will not be repeated here.

The structure of the third imaging module 40 is similar to the structure of the second imaging module 30. For example, the third imaging module 40 may be also a vertical lens module. Therefore, for the characteristics of the third imaging module 40, reference may be made to the characteristics of the second imaging module 40, which is not repeated here.

In summary, the first imaging module 20 includes a housing 21, a reflective element 22, a mounting base 23, and a first image sensor 26. The reflective element 22, the mounting base 23, and the first image sensor 26 are all disposed in the housing 21. The housing 21 includes a light inlet 211. The mounting base 23 is disposed on the reflective element 22.

The reflective element 22 is configured to redirect the incident light incident from the light inlet 211, and the incident light passes through the first lens assembly 24 to reach the first image sensor 26, such that the first image sensor 26 senses the incident light outside the first imaging module 20.

The mounting base 23 is arranged with a limiting structure 232 connected to the reflective element 22 to limit the position of the reflective element 22 on the mounting base 23.

In this way, the limiting structure 232 restricts the position of the reflective element 22 on the mounting base 23, such that the reflective element 22 may not be deviated in position under impact, which is beneficial to the normal use of the first imaging module 20.

In the description of this specification, reference to the descriptions of the terms "an embodiment", "some embodiments", "schematic embodiments", "examples", "specific examples", or "some examples" indicates that specific features, structures, materials, or characteristics described in the embodiments or examples are included in at least one embodiment or example of the present disclosure. In this specification, the schematic expression of the above-mentioned terms does not necessarily refer to a same embodiment or example. Moreover, the specific features, structures, materials, or characteristics described may be combined in any suitable manner in any one or more embodiments or examples.

Although the embodiments of the present disclosure have been shown and described, a person skilled in the art may understand that various changes, modifications, replacements, and variations can be made to these embodiments without departing from the principle and purpose of the present disclosure. The scope of the present disclosure is defined by the claims and their equivalents.

What is claimed is:

1. An imaging module, comprising:
a housing comprising a light inlet; and
a reflective element, a mounting base, and an image sensor arranged in the housing; the reflective element being configured to redirect incident light from the light inlet to the image sensor, and the image sensor sensing the incident light outside the imaging module;
the reflective element arranged on the mounting base; the mounting base being arranged with a limiting structure connected to the reflective element and configured to limit a position of the reflective element on the mounting base;
wherein the imaging module further comprising a drive device disposed in the housing and configured to drive the mounting base with the reflective element to rotate around a rotating axis, for implementing an anti-shaking function in a direction along an optical axis of the light inlet; the drive device is further configured to drive the mounting base with the reflective element to move along an axial direction of the rotating axis, for implementing another anti-shaking function in the axial direction of the rotating axis; the rotating axis is perpendicular to the optical axis of the light inlet;
wherein the drive device is formed with an arc-shaped guide rail, and configured to drive the mounting base to rotate around a central axis of the arc-shaped guide rail along the arc-shaped guide rail, and move along an axial direction of the central axis of the arc-shaped guide rail; the central axis is coincided with the rotating axis; and the central axis of the arc-shaped guide rail is outside the imaging module.

2. The imaging module according to claim 1, wherein the mounting base defines a mounting groove formed therein; the reflective element is disposed in the mounting groove; the limiting structure is disposed at an edge of the mounting groove and configured to abut against an edge of the reflective element.

3. The imaging module according to claim 2, wherein the reflective element has a light incident surface facing the light inlet and a light emitting surface connected to the light incident surface; the light emitting surface faces the image sensor; the limiting structure comprises a protrusion protruding from the edge of the mounting groove and abutting against an edge of the light emitting surface.

4. The imaging module according to claim 3, wherein the protrusion is substantially strip-shaped and extends along the edge of the light emitting surface.

5. The imaging module according to claim 1, wherein the mounting base comprises an arc-shaped surface concentrically disposed with the arc-shaped guide rail and cooperating with the arc-shaped guide rail.

6. The imaging module according to claim 1, further comprising a lens assembly, a moving element, and a drive mechanism all disposed in the housing; the moving element is disposed between the reflective element and the image sensor; the lens assembly is fixed to the moving element; the drive mechanism is configured to drive the moving element to move along an optical axis of the lens assembly, such that the lens assembly performs focusing and the image sensor performs imaging.

7. The imaging module according to claim 6, further comprising a chip circuit board and a drive chip; wherein the chip circuit board is fixed on a side surface of the drive mechanism; the drive chip is fixed on a surface of the chip circuit board opposite to the drive mechanism; the drive chip is electrically connected to the drive mechanism through the chip circuit board.

8. The imaging module according to claim 7, further comprising a sensor circuit board; wherein the image sensor is fixed to the sensor circuit board; the chip circuit board comprises a mounting portion and a connecting portion; the mounting portion is fixed to the side surface of the drive mechanism; the drive chip is fixed to the mounting portion; the connecting portion connects the mounting portion and the sensor circuit board.

9. The imaging module according to claim 7, further comprising a shielding cover fixed to the chip circuit board and covering the drive chip.

10. The imaging module according to claim 1, wherein the reflective element has a light incident surface, a backlight surface, a light reflective surface and a light emitting surface; the light incident surface is close to and faces the light inlet; the backlight surface is away from the light inlet and opposite to the light incident surface; the light reflective surface is connected to the light incident surface and the backlight surface; the light emitting surface is connected to the light incident surface and the backlight surface; the light reflective surface is inclined relative to the light incident surface; the light emitting surface is opposite to the light reflective surface.

11. The imaging module according to claim 10, wherein the light incident surface is substantially parallel to the backlight surface; the light incident surface and the backlight surface are substantially perpendicular to the light emitting surface.

12. The imaging module according to claim 10, wherein the light incident surface, the backlight surface, the light reflective surface, and the light emitting surface are all hardened to form a hardened layer.

13. A camera assembly, comprising a first imaging module, a second imaging module, and a third imaging module; wherein the first imaging module is an imaging module, comprising:
  a housing, comprising a light inlet; and
  a reflective element, a mounting base, and an image sensor arranged in the housing; the reflective element being configured to redirect incident light from the light inlet to the image sensor, and the image sensor sensing the incident light outside the imaging module;
  wherein the reflective element is arranged on the mounting base; the mounting base is arranged with a limiting structure connected to the reflective element and configured to limit a position of the reflective element on the mounting base; and
  a field of view of the third imaging module is greater than the field of view of the first imaging module and less than the field of view of the second imaging module;
  wherein the imaging module further comprising a drive device disposed in the housing and configured to drive the mounting base with the reflective element to rotate around a rotating axis, for implementing an anti-shaking function in a direction along an optical axis of the light inlet; the drive device is further configured to drive the mounting base with the reflective element to move along an axial direction of the rotating axis, for implementing another anti-shaking function in the axial direction of the rotating axis; the rotating axis is perpendicular to the optical axis of the light inlet;
  wherein the drive device is formed with an arc-shaped guide rail, and configured to drive the mounting base to rotate around a central axis of the arc-shaped guide rail along the arc-shaped guide rail, and move along an axial direction of the central axis of the arc-shaped guide rail; the central axis is coincided with the rotating axis; and the central axis of the arc-shaped guide rail is outside the imaging module.

14. The camera assembly according to claim 13, wherein the first imaging module, the second imaging module, and the third imaging module are disposed in a line; the second imaging module is disposed between the first imaging module and the third imaging module.

15. The camera assembly according to claim 13, further comprising a bracket; wherein the first imaging module, the second imaging module, and the third imaging module are all disposed in and fixedly connected to the bracket.

16. The camera assembly according to claim 13, wherein the first camera module and the second camera module are spaced apart.

17. An electronic device, comprising:
  a body; and
  a sliding module configured to slide between a first position received in the body and a second position exposed from the body;
  wherein a camera assembly is disposed in the sliding module, the camera assembly comprising: a first imaging module, a second imaging module, and a third imaging module; the first imaging module is an imaging module, comprising:
    a housing, comprising a light inlet; and
    a reflective element, a mounting base, and an image sensor arranged in the housing; the reflective element being configured to redirect incident light from the light inlet to the image sensor, and the image sensor sensing the incident light outside the imaging module;
    the reflective element arranged on the mounting base; the mounting base being arranged with a limiting structure connected to the reflective element and configured to limit a position of the reflective element on the mounting base;
    wherein a field of view of the third imaging module is greater than the field of view of the first imaging module and less than the field of view of the second imaging module;
    wherein the imaging module further comprising a drive device disposed in the housing and configured to drive the mounting base with the reflective element to rotate around a rotating axis, for implementing an anti-shaking function in a direction along an optical axis of the light inlet; the drive device is further configured to drive the mounting base with the reflective element to move along an axial direction of the rotating axis, for implementing another anti-shaking function in the axial direction of the rotating axis; the rotating axis is perpendicular to the optical axis of the light inlet;

wherein the drive device is formed with an arc-shaped guide rail, and configured to drive the mounting base to rotate around a central axis of the arc-shaped guide rail along the arc-shaped guide rail, and move along an axial direction of the central axis of the arc-shaped guide rail; the central axis is coincided with the rotating axis; and the central axis of the arc-shaped guide rail is outside the imaging module.

18. The electronic device according to claim 17, wherein a gyroscope is disposed in the sliding module; the camera assembly and the gyroscope are disposed separately; the gyroscope is configured to detect a shaking of the sliding module and feedback corresponding data.

* * * * *